United States Patent
Choi et al.

(10) Patent No.: US 9,590,960 B2
(45) Date of Patent: Mar. 7, 2017

(54) METHOD AND APPARATUS FOR CONTROLLING TRANSMISSION OF CONTENT DATA

(75) Inventors: Sang-su Choi, Hwaseong-si (KR);
Yang-Lim Choi, Seongnam-si (KR);
Jun-bum Shin, Suwon-si (KR);
So-young Lee, Suwon-si (KR);
Sun-Nam Lee, Suwon-si (KR);
Ji-young Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1709 days.

(21) Appl. No.: 12/026,654

(22) Filed: Feb. 6, 2008

(65) Prior Publication Data

US 2008/0250144 A1 Oct. 9, 2008

(30) Foreign Application Priority Data

Apr. 6, 2007 (KR) .................. 10-2007-0034420

(51) Int. Cl.
*H04L 29/06* (2006.01)
*H04L 29/08* (2006.01)

(52) U.S. Cl.
CPC ............ *H04L 63/061* (2013.01); *H04L 67/32* (2013.01); *H04L 63/08* (2013.01); *H04L 69/324* (2013.01)

(58) Field of Classification Search
USPC ........................................ 709/227
See application file for complete search history.

(56) References Cited

U.S. PATENT DOCUMENTS

| | | | |
|---|---|---|---|
| 7,593,423 B2* | 9/2009 | Guo et al. ................ | 370/445 |
| 7,602,707 B2 | 10/2009 | Guo et al. | |
| 8,190,891 B2 | 5/2012 | Saito et al. | |
| 2004/0095883 A1* | 5/2004 | Chu et al. ................ | 370/235 |
| 2005/0198029 A1 | 9/2005 | Pohja et al. | |

(Continued)

FOREIGN PATENT DOCUMENTS

| | | |
|---|---|---|
| JP | 2007-074285 A | 3/2007 |
| KR | 10-2005-0115253 A | 12/2005 |
| KR | 10-2006-0132681 A | 12/2006 |

OTHER PUBLICATIONS

Communication dated Jul. 25, 2013 from the Korean Intellectual Property Office in a counterpart application No. 10-2007-34420.

(Continued)

*Primary Examiner* — Joe Chacko
(74) *Attorney, Agent, or Firm* — Sughrue Mion, PLLC

(57) ABSTRACT

Provided are a method and apparatus for controlling transmission of content data. In the method, a communication channel is initially established to transmit the content data, the content data is transmitted through the established communication channel, verification is performed a plurality of times to determine whether the content data is transmitted within an acceptable transmission range, and whether to continue the transmission of the content data is determined according to the verification result. Accordingly, when a client moves to a location outside a predetermined acceptable transmission range in a wireless environment, a server stops transmission of the content data. In addition, content data can be continuously transmitted regardless of interference caused by a temporary obstacle between a server and a client.

14 Claims, 4 Drawing Sheets

(56) References Cited

U.S. PATENT DOCUMENTS

| | | | |
|---|---|---|---|
| 2006/0072493 A1* | 4/2006 | Ginzburg et al. | 370/328 |
| 2006/0174030 A1* | 8/2006 | Choi et al. | 709/236 |
| 2006/0184664 A1* | 8/2006 | Jung | 709/224 |
| 2006/0195629 A1* | 8/2006 | Sharma et al. | 710/30 |
| 2006/0293066 A1* | 12/2006 | Edge et al. | 455/456.3 |
| 2007/0082677 A1* | 4/2007 | Hart et al. | 455/456.1 |
| 2007/0281716 A1* | 12/2007 | Altman et al. | 455/466 |
| 2008/0148360 A1* | 6/2008 | Karstens | 726/4 |
| 2008/0192935 A1* | 8/2008 | Saito et al. | 380/270 |

OTHER PUBLICATIONS

Communication dated Nov. 6, 2013 issued by the Korean Intellectual Property Office in counterpart Korean Patent Application No. 10-2007-0034420.

* cited by examiner

METHOD AND APPARATUS FOR CONTROLLING TRANSMISSION OF CONTENT DATA

CROSS-REFERENCE TO RELATED PATENT APPLICATION

This application claims the benefit of Korean Patent Application No. 10-2007-0034420, filed on Apr. 6, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to controlling transmission of content data, and more particularly, to controlling transmission of content data, in which a communication channel is initially established to transmit the content data, the content data is then transmitted through the established communication channel, verification is then performed a plurality of times to determine whether the content data is transmitted within an acceptable transmission range, and whether to continue the transmission of the content data is then determined according to the verification result.

2. Description of the Related Art

In a wired communication environment, data communication can be reliably achieved between devices since, once an initial session is established between a server and a client, the location of a receiving end and a data arrival time do not change while data is being transmitted. On the other hand, in a wireless communication environment, some problems may occur such as data transmission collision, data loss, etc. This is because several factors interrupt reliable communication in the wireless communication environment. Examples of such factors include use of a multi-path scheme, fading, interference, etc.

In the wireless communication environment, a server may determine an acceptable transmission range (or local range) in addition to an accessible range in which communication is available. Since a plurality of anonymous devices may receive radio waves in the accessible range in the wireless communication environment, the server must properly limit the acceptable transmission range.

In this case, a localization process is performed. The localization process is defined as a process of verifying whether a client is located within a limited acceptable transmission range. In general, the localization process is carried out by using a method of restricting a round trip time (RTT) of a packet transmitted between a server and a client so that the RTT is below a predetermined value.

FIG. 1 is a view for explaining a conventional method of transmitting content data between a server and a client.

Referring to FIG. 1, data has been conventionally transmitted between a server 110 and a client 120 in the following procedure. The client 120 requests the server 110 for content data (operation 130). In order to decide validity of the client 120, the server 110 performs an operation for mutual authentication and session key exchange (operation 140). For example, authentication and key exchange (AKE) is performed when using a digital transmission content protection over Internet protocol (DTCP/IP). The aforementioned localization operation is performed while exchanging a challenge key or an exchange key. When the AKE is successful, the server 110 transmits the content data requested by the client 120 (operations 150 to 170).

However, conventionally, the localization operation is performed only once when the AKE is carried out while an initial session is established, and thereafter the server 10 continuously transmits the content data to the client 120. Thus, the server 110 may continuously transmit the content data even when the client 120 is located at a later time in a position where a localization condition is not satisfied. In addition, localization may fail when interference temporarily occurs in the process of localization due to a certain obstacle, and thus the server 110 may stop the transmission of the content data.

SUMMARY OF THE INVENTION

The present invention provides a method and apparatus for controlling transmission of content data, in which a communication channel is initially established to transmit the content data, the content data is transmitted through the established communication channel, verification is performed a plurality of times to determine whether the content data is transmitted within an acceptable transmission range, and whether to continue the transmission of the content data is determined according to the verification result.

According to an aspect of the present invention, there is provided a method of controlling transmission of content data, the method including: initially establishing a communication channel through which the content data is transmitted; transmitting the content data through the communication channel; verifying a plurality of times whether the content data is transmitted within an acceptable transmission range; and determining whether to transmit the content data according to the verification result.

The operation of determining whether to transmit the content data may be performed according to a ratio of how many times the content data is transmitted within the acceptable transmission range to how many times verification is attempted in the verifying a plurality of times whether the content data is transmitted within the acceptable transmission range.

In the operation of determining whether to transmit the content data, the transmission of the content data may be stopped when the ratio is less than a threshold level.

In the operation of verifying, verification may be periodically performed according to a specific time interval, or according to an amount of the content data to be transmitted.

In the operation of verifying, an RTT (round trip time) of a packet may be measured while transmitting the content data so as to determine whether the content data is transmitted within an acceptable transmission range.

In the operation of initial establishing a communication channel, an AKE (authentication and key exchange) operation may be performed.

In the operation of determining whether to transmit the content data, a flag may be set to determine whether the content data can be stored.

According to another aspect of the present invention, there is provided an apparatus for controlling transmission of content data, the apparatus including: a session establisher initially establishing a communication channel through which the content data is transmitted; a data transmitter transmitting the content data through the communication channel established by the session establisher; a localization unit verifying a plurality of times whether the content data transmitted from the data transmitter is transmitted within an acceptable transmission range; and a data transmission controller determining whether to transmit the content data according to the verification result determined by the localization unit.

The data transmission controller may determine whether to transmit the content data according to a ratio of how many times the content data is transmitted within the acceptable transmission range to how many times verification is attempted by the localization unit.

The data transmission controller may stop the transmission of the content data when the ratio is less than a threshold level.

The localization unit may periodically perform verification according to a specific time interval, or according to an amount of the content data to be transmitted.

The localization unit may measure an RTT (round trip time) of a packet while transmitting the content data so as to determine whether the content data is transmitted within the acceptable transmission range.

The session establisher may perform an AKE (authentication and key exchange) operation. The data transmitter may transmit the content data regardless of whether the content is transmitted within the acceptable transmission range after the AKE operation is performed.

The data transmission controller may set a flag to determine whether the content data can be stored.

According to another aspect of the present invention, there is provided a computer-readable medium having embodied thereon a computer program for executing a method of controlling transmission.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the accompanying drawings.

Figure 1:
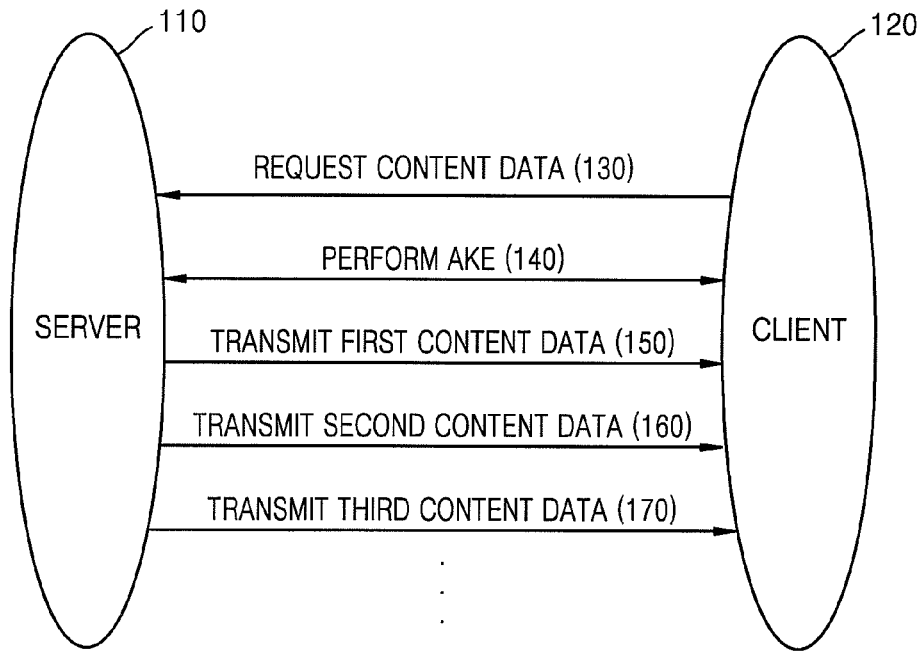
FIG. 1 is a view for explaining a conventional method of transmitting content data between a server and a client.
Figure 2:
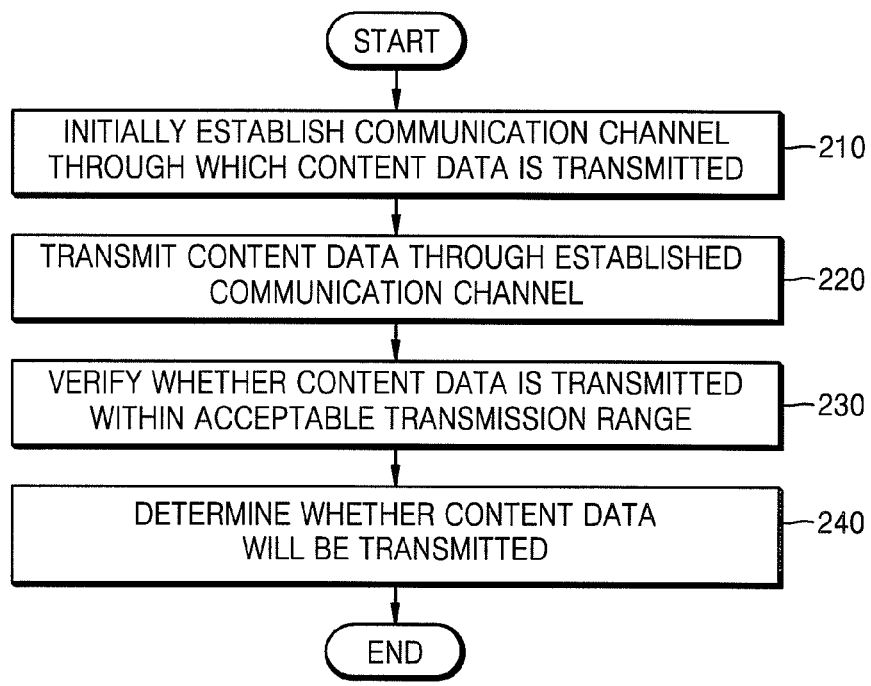
FIG. 2 is a flowchart of a method of controlling transmission of content data according to an embodiment of the present invention.

FIG. 2 is a flowchart of a method of controlling transmission of content data according to an embodiment of the present invention.

Referring to FIG. 2, the method includes: initially establishing a communication channel through which the content data is transmitted (operation 210); transmitting the content data through the established communication channel (operation 220); performing localization a plurality of times to verity whether the content data is transmitted within an acceptable transmission range (operation 230); and determining whether to transmit the content data according to the verification result (operation 240).

In operation 210, a communication state is initiated before the content data is transmitted. That is, in order to establish the communication channel, a session is connected between a server and a client according to a session initialization protocol. In an embodiment the client may be an external device.

In operation 220, the content data is transmitted through the communication channel. The content data may be transmitted prior to or at the same time as the localization which is performed to verify whether the client is located within a limited acceptable transmission range (or local area). When the content data is transmitted prior to the localization, a sort of open document (e.g., advertisement broadcasting, information message, etc.), which is not restricted to a dedicated client but is open to third parties, may be transmitted.

In operation 230, such a localization operation is performed a plurality of times to verify whether the client is located within the limited acceptable transmission range. The localization operation is performed while the content data is transmitted. The localization operation performed a plurality of times may be regularly performed according to a specific time interval or may be periodically performed according to the amount of content data to be transmitted.

In operation 240, it is determined whether to continue the transmission of the content data according to the localization result. If the localization is successful, the transmission of the content data is continued. Otherwise, the client is regarded as being located outside the acceptable transmission range, thereby stopping the transmission of the content data. Afterwards, when the client requests re-transmission of the content data, the server may be subject to the aforementioned session initialization and localization operations so as to retransmit the content data.

The data transmission process between the server and the client will now be described further with reference to FIG. 3.

Figure 3:
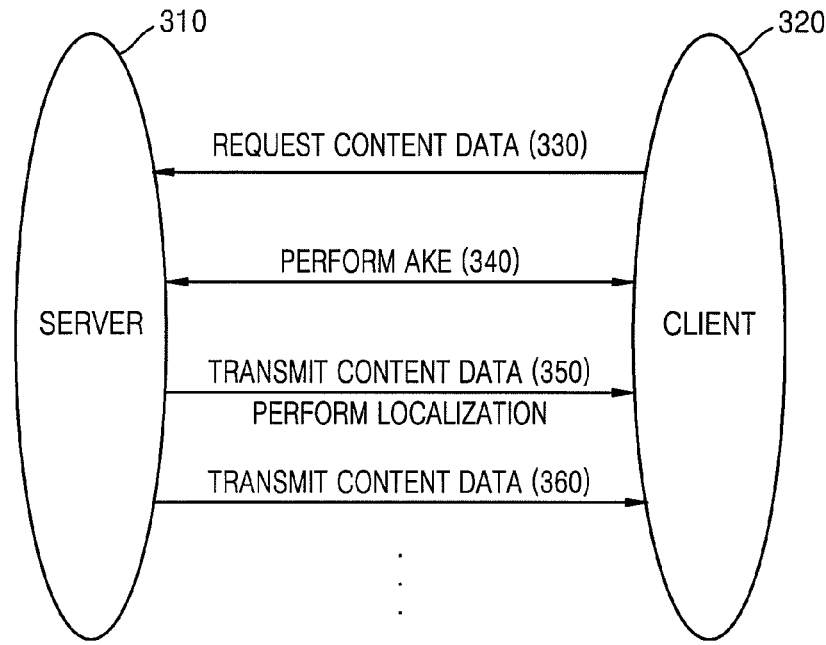
FIG. 3 is a view for explaining a method of transmitting content data between a server and a client according to an embodiment of the present invention.

FIG. 3 is a view for explaining a method of transmitting content data between a server and a client, e.g., an external device, according to an embodiment of the present invention.

Data transmission between a server 310 and a client 320 is achieved according to the method of controlling transmission of content data of the present invention.

Referring to FIG. 3, when the client 320 requests the server 310 to transmit content data (operation 330), the server 310 and the client 320 exchange mutual authentication and session keys (e.g., authentication and key exchange (AKE) in digital transmission content protection over Internet protocol (DTCP/IP)) (operation 340). When AKE is successful (operation 340), the server 310 transmits the content data to the client 320. At the same time, the server 310 performs a localization operation to verify whether the client 320 is located within an acceptable transmission range (operation 350). When the localization operation is successful, the transmission of the content data is continued (operation 360). Operations 350 and 360 are repeated in this manner until the transmission of the content data is ended.

Figure 4:
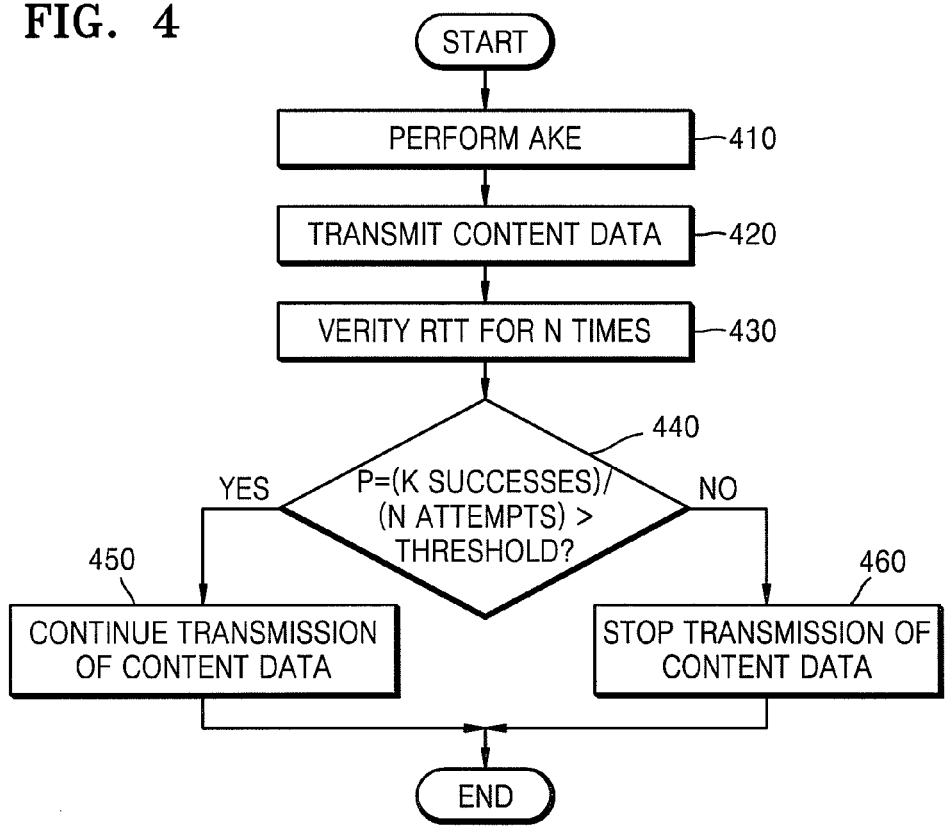
FIG. 4 is a flowchart of a method of controlling transmission of content data according to another embodiment of the present invention.

FIG. 4 is a flowchart of a method of controlling transmission of content data according to another embodiment of the present invention.

Referring to FIG. 4, as described above, AKE is performed when transmission of content data is requested (operation 410).

When the AKE is successful, the content data is transmitted (operation 420). In this process 420, since localization is not yet performed, a certain amount (or a certain time period) of content data is transmitted regardless of whether the client, e.g., an external device, is located within a currently acceptable transmission range.

Thereafter, localization is performed by measuring a round trip time (RTT) of a packet transmitted by the server. The measured RTT is compared with a predetermined threshold level. If the RTT is greater then the threshold level, that is, a delay time is long, it can be determined that the client is located outside the acceptable transmission range (i.e., localization has failed or is unsatisfied).

In order to obtain a highly reliable RTT, the RTT measurement is performed N times rather than one time (operation 430). If localization is successful K times when RTT measurement is performed N times, a probability P can be obtained from a ratio therebetween. If the probability P is greater than a threshold level, it is determined that localization is successful (operation 440). The transmission of the content data is continued until a final localization result is obtained, that is, until the RTT measurement is carried out N times.

According to the probability P indicating how many times localization has been successfully performed out of a total of N attempts, the transmission of the content data is either continued (operation 450) or stopped (operation 460). The decision on whether content transmission will be continued to transmit next content data may be periodically performed according to a predetermined time interval or according to the amount of content data transmitted. Furthermore, even after it is decided that the content data be continuously transmitted, a flag may be set to determine whether the content data being transmitted can be reproduced and stored.

Figure 5:
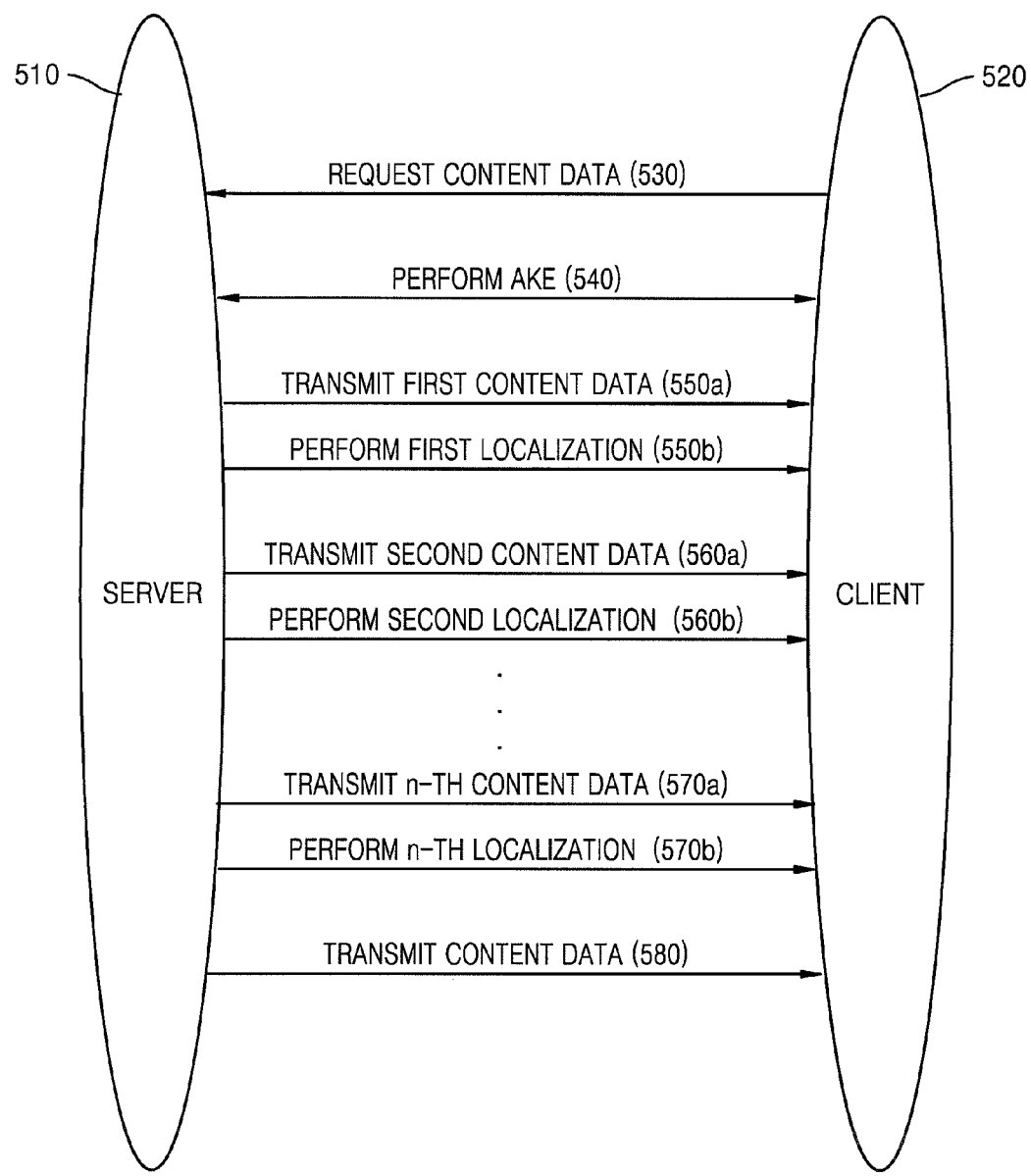
FIG. 5 is a view for explaining a method of transmitting content data between a server and a client according to another embodiment of the present invention.

FIG. 5 is a view for explaining a method of transmitting content data between a server and a client according to another embodiment of the present invention.

Data transmission between a server 510 and a client 520, e.g., an external device, is achieved using the method of controlling transmission of content data according to an embodiment of the present invention as shown in FIG. 4.

Referring to FIG. 5, when the client 520 requests the server 510 to transmit content data (operation 530), the server 510 and the client 520 perform an AKE operation (operation 540).

When the AKE operation is successful (operation 540), the server 510 performs a localization operation (operations 550a to 570b). As described above, the localization operation is repeated by using an RTT from a first operation 550b to an N-th operation 570b. A probability P is calculated using the total number of times K successful localizations are performed and the total number of times N the localization operations are performed. Whether the client 520 satisfies the localization condition is determined according to the probability P. The transmission of the content data is continued until the localization is performed N times (operations 550a, 560a, and 570a). A highly reliable RTT can be obtained by performing verification N times. In addition thereto, the content data can be continuously transmitted even when temporary interference occurs (e.g., due to an obstacle) between the server 510 and the client 520.

Upon completing localization N times, the transmission of the content data is either continued or stopped according to the calculated probability P (operation 580). The localization or the transmission of the content data is periodically performed according to a time sequence or the amount of content data to be transmitted. Accordingly, since the localization is periodically performed a plurality of times, the location of a client can be accurately detected even when the client moves to another location after a first localization is performed.

Meanwhile, whether a final localization is satisfied may be determined by computing a mean value M of RTT values measured N times and then comparing the mean value with a threshold level.

Figure 6:
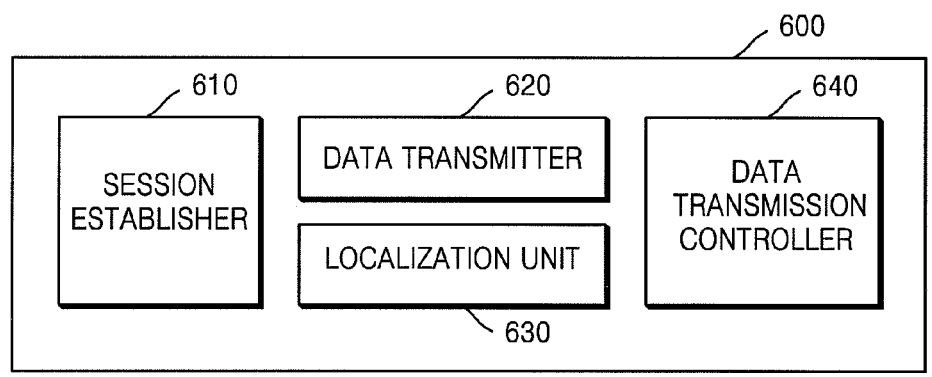
FIG. 6 is a block diagram of an apparatus for controlling transmission of content data according to an embodiment of the present invention.

FIG. 6 is a block diagram of an apparatus for controlling transmission of content data according to an embodiment of the present invention.

Referring to FIG. 6, an apparatus 600 for controlling transmission of content data includes a session establisher 610 which initially establishes a communication channel through which the content data is transmitted, a data transmitter 620 which transmits the content data through the communication channel, a localization unit 630 which verifies a plurality of times whether the content data is transmitted within an acceptable transmission range, and a data transmission controller 640 which determines whether to continue the transmission of the content data according to the verification result.

The session establisher 610 initiates a communication state before the content data is transmitted. In other words, the session establisher 610 establishes an initialization session. The data transmitter 620 transmits the content data through the channel established by the session establisher 610.

The localization unit 630 performs localization to verify whether the client, e.g., an external device, is located within an acceptable transmission range. This verification operation is performed a plurality of times. The localization operation is performed while the content data is transmitted. The localization operation performed a plurality of times may be regularly performed according to a specific time interval or may be periodically performed according to the amount of content data to be transmitted.

If the localization unit 630 determines that localization is successful, the data transmission controller 640 continuously transmits the content data. Otherwise, the client is regarded as being located outside the acceptable transmission range, thereby stopping the transmission of the content data.

Although it has been described that content data is mainly transmitted from a server to a client in the aforementioned embodiments of the present invention, the present invention also applies when the content data is transmitted from the client to the server.

According to a method and apparatus for controlling transmission of content data of the present invention, when a client moves to a location outside a predetermined acceptable transmission range in a wireless environment, a server stops transmission of the content data. For example, if localization is successful when a client of a user accesses a server of a neighbor while the user is visiting the neighbor, transmission of content data may be continued even after the user comes back to his/her home. This can be prevented by the present invention.

In addition, the probability of localization may be calculated so that content data can be continuously transmitted regardless of interference caused by a temporary obstacle between a server and a client.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling transmission of content data, the method comprising: establishing a communication channel with an external device; sequentially transmitting a first, second, third, . . . , Nth pieces of the content data through the communication channel to the external device; verifying, subsequent to transmitting each first, second, . . . , (N−1)th piece of the content data and prior to transmitting the next one of the second, third, . . . , Nth pieces of the content data, whether the first, second, . . . , (N−1)th pieces of the content data are transmitted to the external device within an acceptable transmission range to generate a verification result; and determining whether to transmit the next one of the second, third, . . . , Nth pieces of the content data according to the verification result, wherein the verifying comprises measuring a round trip time (RTT) of a packet to determine whether the first, second, . . . , (N−1)th pieces of the content data are transmitted to the external device within the acceptable transmission range and wherein, in the verifying, verification is periodically performed according to an amount Of the content data to be transmitted.

2. The method of claim 1, wherein, the determining of whether to transmit the next one of the second, third, . . . , Nth pieces of the content data is performed according to a ratio of a number of times the first, second, . . . , (N−1)th pieces of the content data are transmitted to the external device within the acceptable transmission range to a number of times venfication is attempted.

3. The method of claim 2, wherein, m the determining whether to transmit the next one of the second, third, . . . , Nth pieces of the content data, the transmission of the content data is stopped if the ratio is less than a threshold level.

4. The method of claim 1, wherein, m the initial establishing of a communication channel, an authentication and key exchange (AKE) operation is performed.

5. The method of claim 4, wherein, m the establishing of a communication channel, after the AKE operation is performed, the first piece of the content data is transmitted regardless of whether the first piece of the content is transmitted to the external device within the acceptable transmission range.

6. The method of claim 5, wherein, m the determining of whether to transmit the next one of the second, third, . . . , Nth pieces of the content data, a flag is set to determine whether the content data can be stored.

7. An apparatus for controlling transmission of content data, the apparatus comprising:
    a hardware processor comprising:
    a session establisher which establishes a communication channel with an external device;
    a data transmitter which sequentially transmits a first, second, third, . . . , Nth pieces of the content data through the communication channel to the external device;
    a localization unit which verifies, subsequent to transmitting each first, second, . . . , (N−1)th piece of the content data and prior to transmitting the next one of the second, third, . . . , Nth pieces of the content data, whether the first, second, . . . , (N−1)th pieces of the content data transmitted from the data transmitter are transmitted to the external device within an acceptable transmission range to generate a verification result; and
    a data transmission controller which determines whether to transmit the next one of the second, third, . . . , Nth pieces of the content data according to the verification result determined by the localization unit,
    wherein the localization unit measures a round trip time (RTT) of a packet to determine whether the first, second, . . . , (N−1)th pieces of the content data are transmitted to the external device within the acceptable transmission range, and
    the localization unit periodically performs verification according to an amount of the content data to be transmitted.

8. The apparatus of claim 7, wherein the data transmission controller determines whether to transmit the next one of the second, third, . . . , Nth pieces of the content data according to a ratio of a number of times the first, second, . . . , (N−1)th pieces of the content data are transmitted to the external device within the acceptable transmission range to a number of times verification is attempted by the localization unit.

9. The apparatus of claim 8, wherein the data transmission controller stops the transmission of the content data if the ratio is less than a threshold level.

10. The apparatus of claim 7, wherein the session establisher performs an authentication and key exchange (AKE) operation.

11. The apparatus of claim 10, wherein the data transmitter transmits the first piece of the content data regardless of whether the first piece of the content is transmitted to the external device within the acceptable transmission range after the AKE operation is performed.

12. The apparatus of claim 11, wherein the data transmission controller sets a flag to determine whether the content data can be stored.

13. A non-transitory computer-readable medium having embodied thereon a computer program which when executed by a computer causes the computer to execute the method of:
    establishing a communication channel with an external device;
    sequentially transmitting a first, second, third, . . . , Nth pieces of the content data through the communication channel to the external device;
    verifying, subsequent to transmitting each first, second, . . . , (N−1)th piece of the content data and prior to transmitting the next one of the second, third, . . . , Nth pieces of the content data, whether the first, second, . . . , (N−1)th pieces of the content data are transmitted to the external device within an acceptable transmission range to generate a verification result; and determining whether to transmit the next one of the second, third, . . . , Nth pieces of the content data according to the verification result, wherein the verifying comprises measuring a round trip time (RTT) of a packet to determine whether the first, second, . . . , (N−1)th pieces of the content data are transmitted to the external device within the acceptable transmission range, wherein, in the verifying, verification is periodically performed according to an amount of the content data to be transmitted.

14. The method of claim 1, further comprising receiving, from the external device, a request to transfer the content data, prior to the establishing the communication channel with the external device, wherein the verifying comprises: verifying, during the transmitting of the content data, the plurality of times whether the content data is transmitted to the external device within the acceptable transmission range while the requested content data is being transmitted.

* * * * *